J. B. ABBOTT.
CORN-PLANTER.

No. 170,147. Patented Nov. 23, 1875.

Witnesses:
C. H. Willett
Frederick A. Herring

Inventor:
John B. Abbott
By Gridley & Warner
his Attys

UNITED STATES PATENT OFFICE.

JOHN B. ABBOTT, OF SAN JOSÉ, ILLINOIS.

IMPROVEMENT IN CORN-PLANTERS.

Specification forming part of Letters Patent No. 170,147, dated November 23, 1875; application filed July 6, 1875.

*To all whom it may concern:*

Be it known that I, JOHN B. ABBOTT, of San José, in the county of Mason and State of Illinois, have invented certain new and useful Improvements in Corn-Planters, of which improvements the following is a full, clear, and exact description, which will enable others skilled in the art to which my invention appertains to make and use the said improvements, reference being had to the accompanying drawing, forming a part hereof, and in which—

Figure 1:
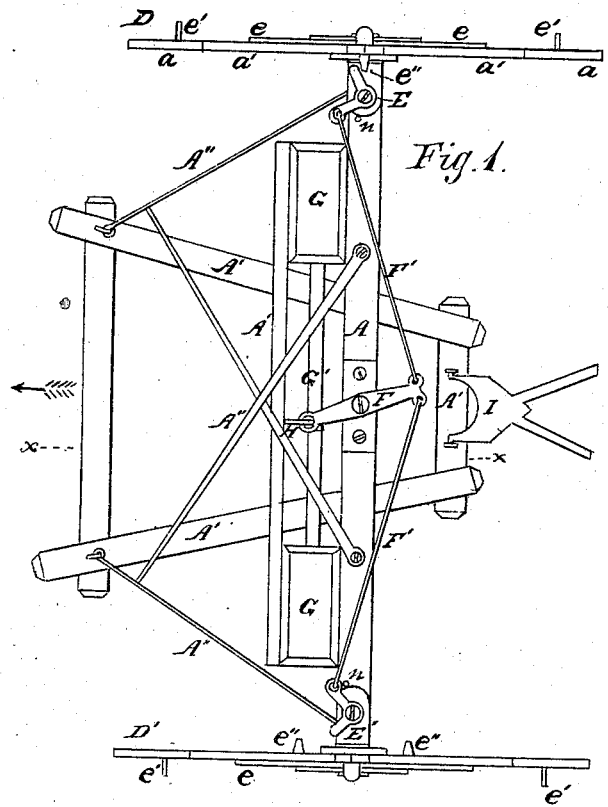
Figure 2:
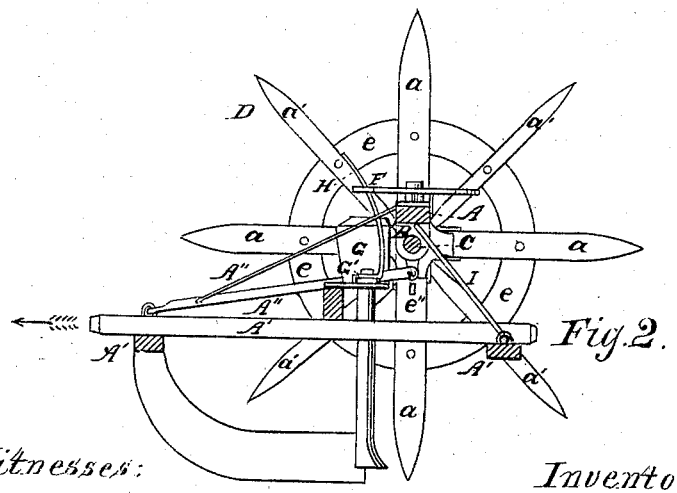

Figure 1 represents a top view of an implement embodying my improvements, and Fig. 2 a section in the plane of the line $x\,x$.

Like letters of reference indicate like parts.

My object is to improve, in several respects, the construction and operation of that class of implements intended for the purpose of planting or dropping corn and marking the rows, and for similar purposes; and to that end my invention consists in certain novel features, substantially as hereinafter specified, relating to the construction of various parts of the implement.

In the drawing, A represents a cross-bar, and B B are hangers or bearings rigidly attached to the ends thereof. C is an axle, turning freely in the bearings B B. D and D' are wheels rigidly mounted on the said axle. $a$ and $a'$ are pointed spokes radiating from a hub, and $e$ is an annular disk, to which they are centrally attached. I deem it preferable to make each alternate spoke—$a'$ $a'$, for example—readily removable and attachable, and for this purpose the inner ends of these spokes may rest freely in sockets in the hubs, and be fastened to the disk $e$, either by means of screws, bolts, and nuts, or other similar and suitable fastening. $e'$ $e'$ are broad stops or shoulders projecting laterally from the spokes, and $e''$ $e''$ are projections extending inwardly from the central part of the wheels. E and E' are bell-cranks pivoted to the bar A, and arranged near each end thereof, as shown. $n\,n$ are pins to limit the movement of the bell-cranks. F is a lever pivoted to the central part of the bar A, and F' F' are connecting-rods jointed or linked to the bell-cranks and to one end of the lever F. G G are the seed-boxes, and G' is a sliding bar, operating in connection therewith in the usual manner, but driven or actuated in the manner hereinafter described. H is an elongated vertical arm, bent in the arc of a circle, and rigidly attached to the slide G'. This arm passes freely through the end of the lever F, as shown. A' is the frame to which the seed-boxes, seed-troughs, and colters are attached, and I is a rest pivoted or hinged to the rear part of this frame. A'' is a brace attached to the bar A and hangers B B, and hinged to the frame A'.

The operation of the implement is as follows, it being understood that it is to be drawn in the direction indicated by the arrow: During the rotation of the wheels one of the projections $e''$ on the wheel D, for example, will strike the bell-crank E, and turn the latter on its pivot, thus vibrating the lever F by means of the connecting-rod F', connected thereto and to the said bell-crank, and sliding the bar G' by reason of the passage of the arm H through the end of the said lever. This movement of the lever F also sets the bell-crank E' to be struck by one of the projections $e''$ on the wheel D', and when this crank is thus struck the movement of the bar G' will be reversed, and the crank E returned to its original position, so as to be again struck by a projection, $e''$, on the wheel D, and the movement now described will thus be repeated during the rotation of the wheels. By this means the bar G' will be moved back and forth with a rapidity depending upon the number of the projections $e''$ $e''$, or their proximity to each other, and upon the speed with which the implement is drawn forward. The pins $n\,n$ prevent the bell-cranks from being moved too far when struck by the projections $e''$ $e''$. The spokes, by being pointed and by projecting beyond the disk $e$, serve as markers, and the stops $e'$ $e'$ prevent them from sinking too deeply into the soil. The spokes $a'$ $a'$ may be removed whenever their removal may be deemed desirable. In order to support the wheels above the soil while the implement is being turned at the ends of the rows, or at other times, the rest I is arranged in the position shown in Fig. 2. At other times the rest may lie in the position shown in Fig. 1. The arm H, by being elongated and curved in the manner described, is prevented from being disengaged from the lever F when the wheels are raised and lowered. The diagonally-arranged arms of the brace A″ prevent the frame A′ from swinging laterally, but allow it to yield vertically to uneven ground without lifting the wheels from the soil.

I am aware that a sliding bar has heretofore been employed in combination with the seed-boxes for the purpose of dropping the corn intermittently. I am also aware that seed troughs or conductors and colters have previously been used in combination with each other and the seed-boxes. I therefore make no claim either to the construction or arrangement of these parts independently of the improvements herein described.

It will be perceived from the foregoing description, and from reference to the drawing, that the implement may be used as a drill as well as a dropper and marker, and that it is light, cheap, and easily managed.

Having thus described my invention, what I claim as new, and desire to secure by Letters Patent, is—

The combination, in a corn-planter, of the projections or pins $e''$ $e''$, extending inwardly from the wheels D and D′, the bell-cranks E and E′, pivoted to the cross-bar A, and arranged for contact with the pins $e''$ $e''$ during the rotation of the said wheels, the lever F, pivoted to the said cross-bar, the connecting-pieces F′ F′, attached to the said lever and bell-cranks, the curved arm H, rigidly attached to the slide-bar G′, and engaging the lever F, and the seed-box frame A′, provided with the rest or support I, and hinged to the cross-bar A, all substantially as and for the purposes specified.

JOHN B. ABBOTT.

Witnesses:
R. W. FLEMING,
E. S. MARTIN.